United States Patent [19]

Kunishige

[11] Patent Number: 5,148,197
[45] Date of Patent: Sep. 15, 1992

[54] DATA PRINTING APPARATUS FOR CAMERA

[75] Inventor: Keiji Kunishige, Hachioji, Japan

[73] Assignee: Olympus Optical Co., Ltd., Tokyo, Japan

[21] Appl. No.: 626,470

[22] Filed: Dec. 12, 1990

[30] Foreign Application Priority Data

Dec. 21, 1989 [JP] Japan ................................ 1-332156

[51] Int. Cl.$^5$ ............................................. G03B 17/24
[52] U.S. Cl. ................................... 354/106; 354/173.1
[58] Field of Search ....................... 354/105, 106, 173.1

[56] References Cited

U.S. PATENT DOCUMENTS 4,958,174  9/1990  Soto et al. ............................. 354/106
5,040,006  8/1991  Matsumura et al. ................. 354/106

FOREIGN PATENT DOCUMENTS 55-126225  9/1980  Japan .
57-55131  11/1982  Japan .
59-74537  4/1984  Japan .
61-56495  12/1986  Japan .
62-203144  9/1987  Japan .
63-284532  11/1988  Japan .

Primary Examiner—Michael L. Gellner
Attorney, Agent, or Firm—Frishauf, Holtz, Goodman & Woodward

[57] ABSTRACT

A data printing apparatus includes a data input unit. A film feed unit feeds a film by a driving operation of a motor. A film feed amount detection unit detects a moving amount of the film. Three light-emitting segments are arranged in a feed direction of the film. Two light-emitting segments are arranged in a direction substantially perpendicular to the feed direction of the film. An emission control unit selectively turns on the light-emitting segments during movement of the film on the basis of an output from the moving amount detection unit and an output from the data input unit. A data numeral is formed on a film surface by selective emission of the two and three light-emitting segments.

18 Claims, 19 Drawing Sheets

FILM TRAVEL DIRECTION   FILM TRAVEL DIRECTION

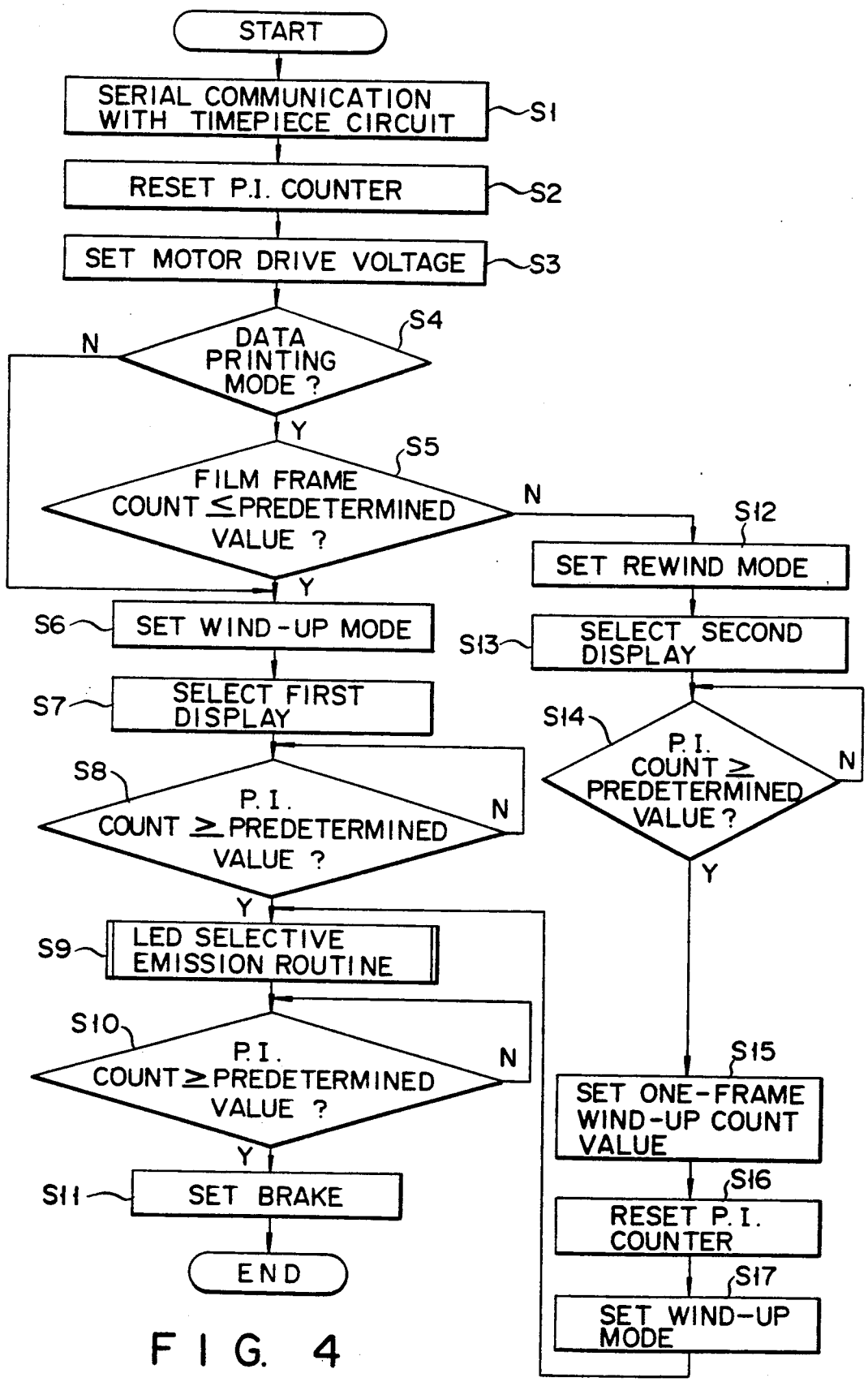
F I G. 4

| REGISTER B \ D | 0 | 1 | 2 | 3 | 4 | 5 | RESULT |
|---|---|---|---|---|---|---|---|
| 0 | ⌐∟ | x | x | x | │ | x | ◌ |
| 1 | x | x | │ | x | x | x | │ |
| 2 | =∟ | x | x | x | │ | x | ⌐⌐ |
| 3 | = | x | x | x | │ | x | ⌐⌐ |
| 4 | ∟ | x | │ | x | x | x | ⊔⊤ |
| 5 | ⌐= | x | x | x | │ | x | ⌐⌐ |
| 6 | ∟= | x | x | x | │ | x | ∟⌐ |
| 7 | ⌐ | x | x | x | │ | x | ⌐│ |
| 8 | ⌐∟= | x | x | x | │ | x | ⌐⌐ |
| 9 | ⌐= | x | x | x | │ | x | ⌐⌐ |
| A | − | x | x | x | x | x | − |

F I G. 7

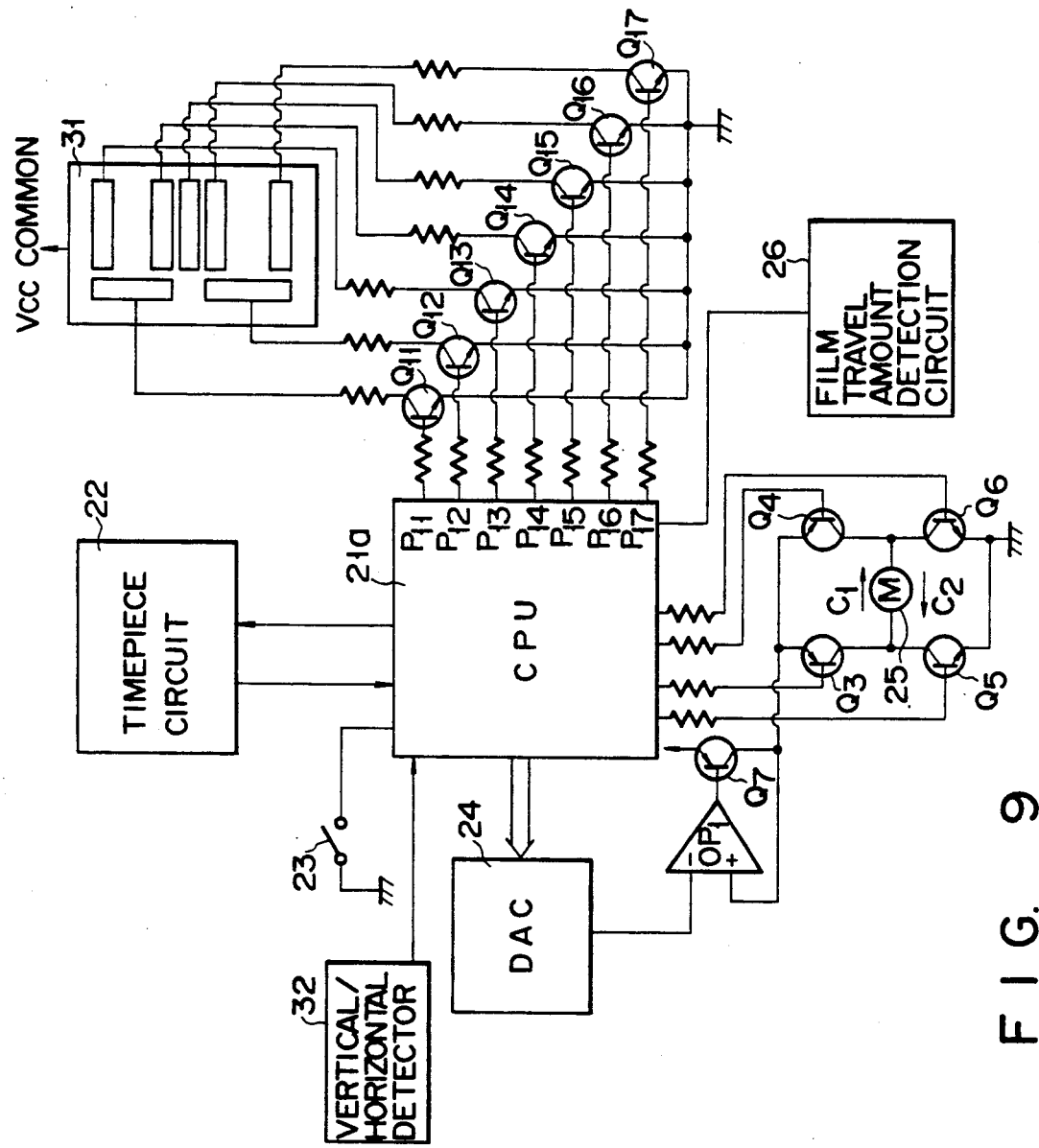
F I G. 9

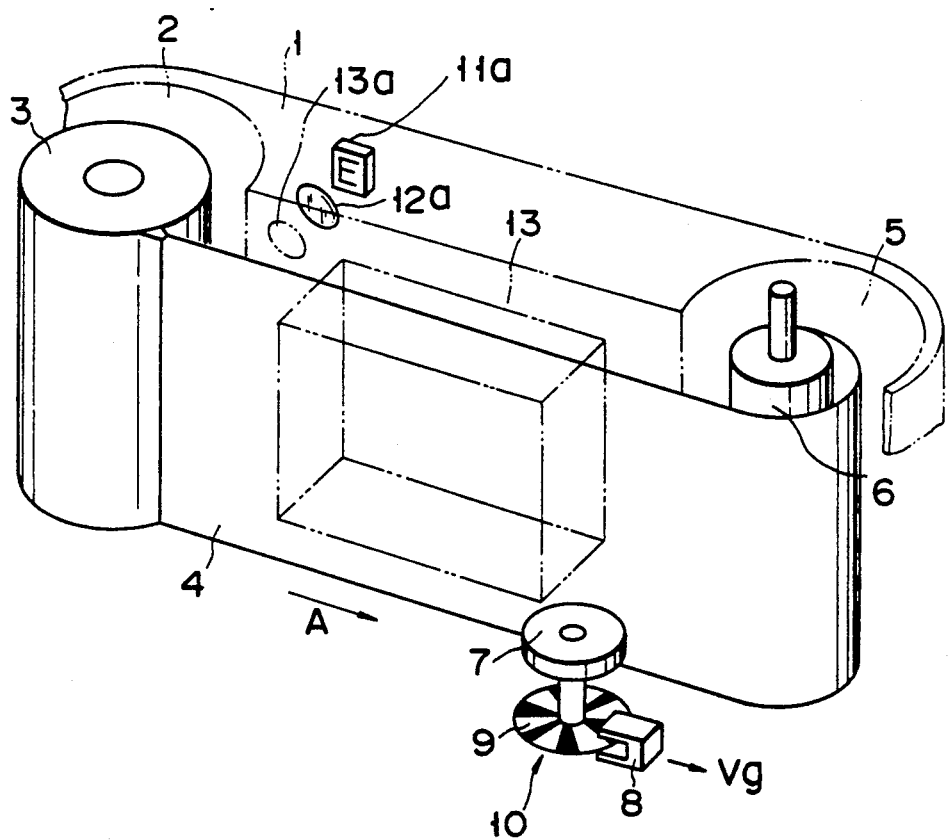
F I G. 12

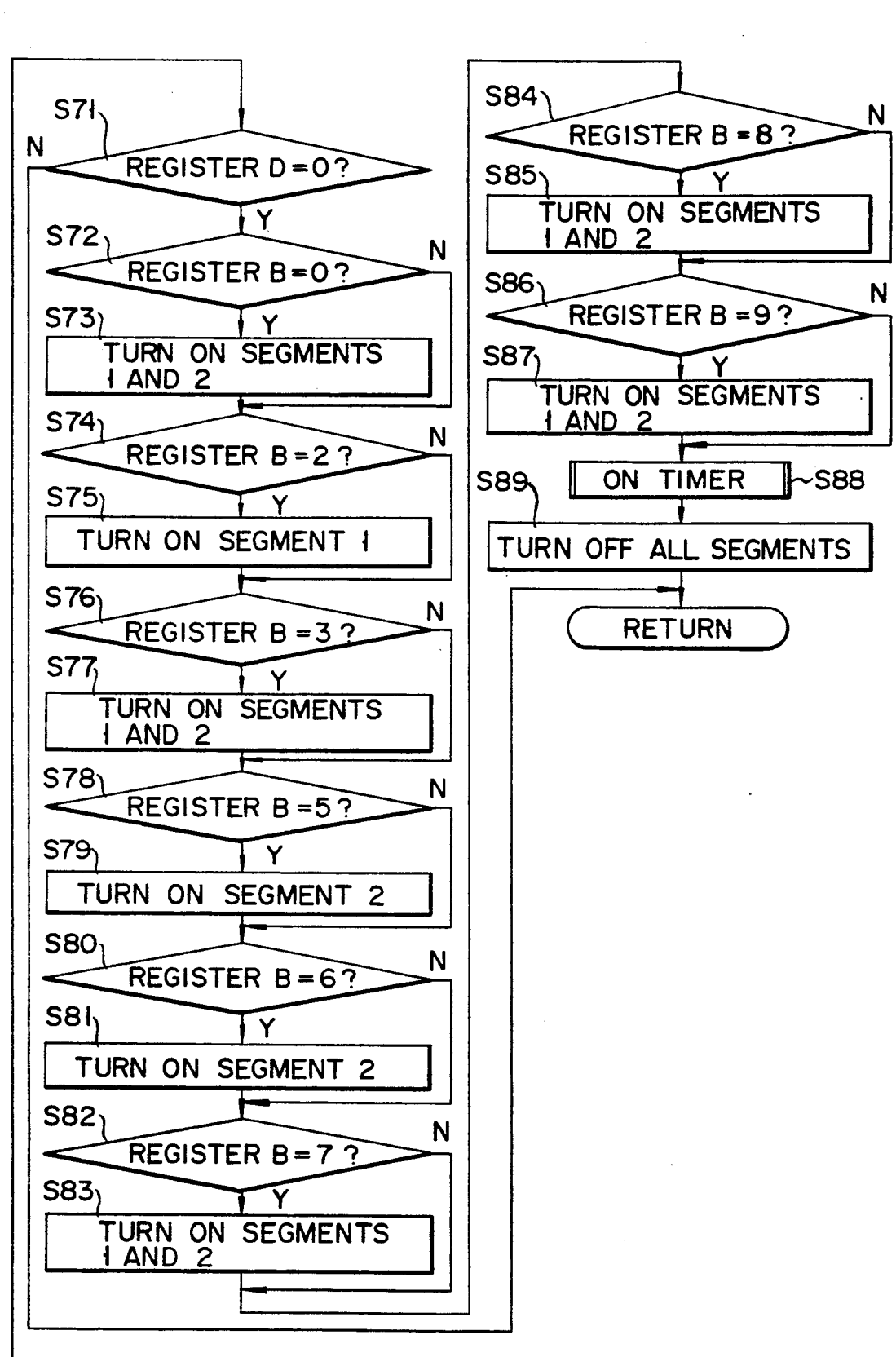
F I G. 14B

DATA PRINTING APPARATUS FOR CAMERA

BACKGROUND OF THE INVENTION

1. Field of the Invention

The present invention relates to a data printing apparatus for a camera and, more particularly, to a data printing apparatus for a camera, which can write data such as a photographing date on a film of the camera as a photographing medium.

2. Description of the Related Art

Conventionally, a data printing apparatus which comprises light-emitting elements defining numerals and characters necessary for printing, e.g., a date, and prints a date on a still film is known. On the other hand, as shown in FIGS. 16A and 16B or FIG. 17, a data printing apparatus which drives light-emitting elements in synchronism with travel of a film, and prints, e.g., a date on the traveling film is known. More specifically, in FIG. 16A, when a photographed film is wound up from a patrone 45 around a take-up spool 44, a position where data such as a date is written is detected by a position detector 41. When the write position is reached, a driver 42 is driven to turn on a 7-segment display 43 for a short period of time, thereby printing numerals shown in FIG. 16B on a predetermined position on the film. In FIG. 17, LEDs 49a, 49b, . . . , 49g, and a focusing lens 48 are arranged adjacent to a film 46, and when the film 46 is wound up upon completion of a photographing operation, the LEDs 49a, 49b, . . . , 49g are dynamically turned on, thereby printing desired data on the film.

A data writing apparatus of this type is disclosed in, e.g., Published Examined Japanese Patent Application No. 57-55131, Published Unexamined Japanese Patent Application No. 59-74537 (an arrangement disclosed in these references is shown in FIG. 16A), Published Examined Japanese Patent Application No. 61-56495 (its arrangement is shown in FIG. 17), and the like. As shown in FIG. 17, when data is printed using an LED dot array, not only numerals but also characters can be printed. In this case, high-resolution moving amount detection, and moving amount control are required to synchronize ON operations of LEDs with movement of a film. More specifically, if one character is expressed by 6×8 dots, position detection having a resolution of (width of one character)/6 is required.

In order to print one character, a time given by (necessary LED ON time)×6 is required, and a film wind-up operation takes much time.

When the 7-segment display is used as shown in FIG. 16A, numerals can only be printed. In this case, moving amount detection requires only a low resolution, and one character can be printed within one print time. However, this means requires 7+1 wiring, seven LEDs, and a driver circuit. The 7-segment LED display unit has predetermined fonts, as shown in FIG. 16B, and since vertical lines of "4" and "1" are offset from the center, these numerals undesirably have offset character intervals. In order to prevent this, two segments must be added to provide a 9-segment numeral display. This countermeasure conflicts with an object for decreasing the number of display segments.

SUMMARY OF THE INVENTION

It is, therefore, an object of the present invention to provide a highly reliable data printing apparatus which can turn on/off a smaller number of display segments in synchronism with a traveling film.

It is another object of the present invention to provide a compact, low-cost camera which turns on/off a smaller number of display segments in synchronism with a traveling film.

In order to achieve the above objects, a data printing apparatus according to the present invention comprises data input means, film feed means for feeding a film by a driving operation of a motor, film feed amount detection means for detecting a feed amount of the film, three light-emitting segments arranged at equal intervals to be parallel to a feed direction of the film, two light-emitting segments arranged to be substantially perpendicular to the feed direction of the film, an optical path for guiding light from the light-emitting segments to a film surface, and emission control means for selectively turning on the light-emitting segments during a feed operation of the film on the basis of an output from the film feed amount detection means, and an output from the data input means, wherein a data numeral is formed on a film surface by selectively turning on the three and two lightemitting segments.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a flow chart showing an operation of the first embodiment shown in FIG. 3;

FIG. 7 is an explanatory view showing the progress of a printing operation of decimal number as characters on a film in association with registers D and B;

FIG. 9 is a block diagram showing a data printing apparatus for a camera according to the second embodiment of the present invention;

FIG. 12 is a perspective view of a camera to which the third embodiment of the present invention is applied;

FIGS. 14A and 14B are flow charts showing in detail an LED ON/OFF routine in FIG. 13;

DETAILED DESCRIPTION OF THE PREFERRED EMBODIMENTS

An embodiment of the present invention will be described hereinafter.

Prior to a description of an embodiment of the present invention, an arrangement of display segments constituting a display used as a data printing light-emitting element of a data printing apparatus for a camera according to the present invention will be described below with reference to FIGS. 2A to 2C. This display has an E-shaped segment structure using, e.g., red LEDs. A standard segment arrangement shown in FIG. 2A is constituted by five display segments $S_1$ to $S_5$. FIG. 2B shows an embodiment wherein the vertical display segments in FIG. 2A are obliquely arranged to form a character with higher quality. FIG. 2C shows another embodiment for performing vertical and horizontal data writing operations in correspondence with vertical and horizontal photographing operations of a camera. In this case, two segments $S_6$ and $S_7$ are added to the display segments shown in FIG. 2A or 2B. The display shown in FIG. 2A or 2B is used in the first embodiment (to be described below), and the display shown in FIG. 2C is used in the second embodiment (to be described later). The first embodiment of the present invention will be described below with reference to FIG. 1 and FIGS. 3 to 8.

Figure 1:
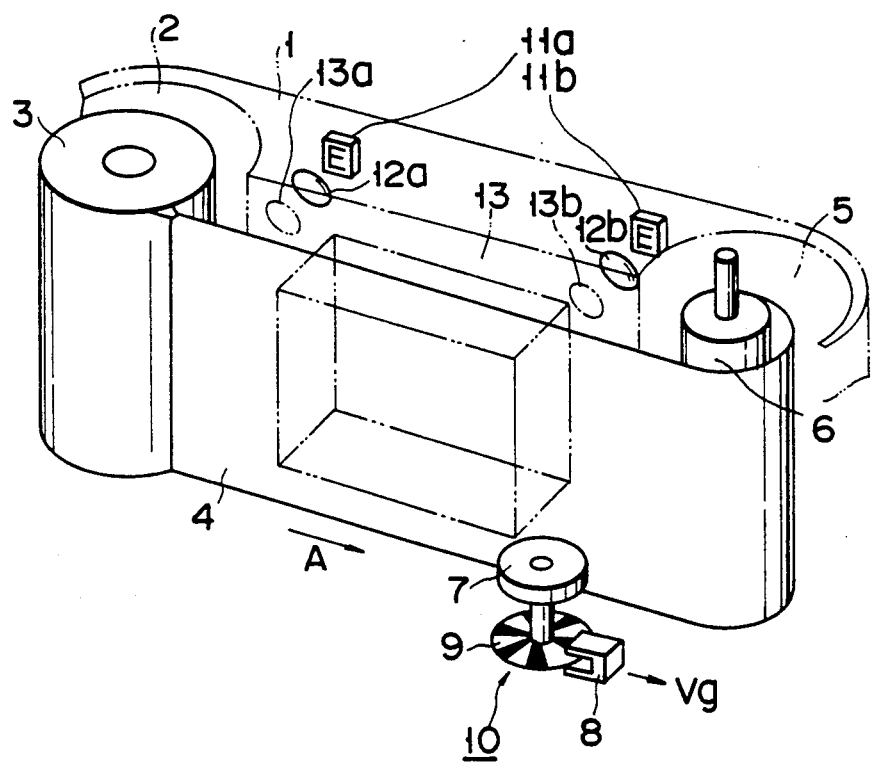
FIG. 1 is a perspective view of a camera to which a data printing apparatus according to the present invention is applied.
Figures 2A, 2B:
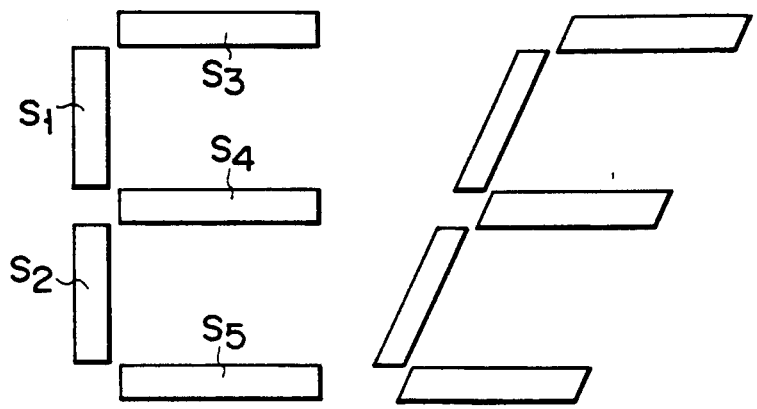
FIGS. 2A, 2B, and 2C show display patterns of display segments used in the data printing apparatus of the present invention.
Figure 2C:
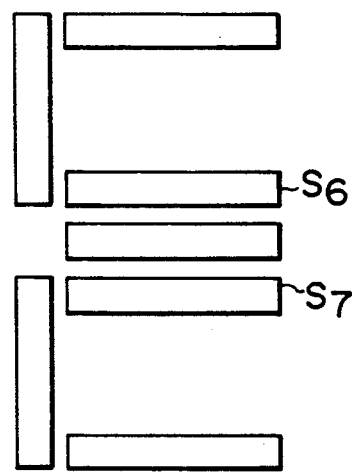

FIG. 1 is an exploded perspective view of a camera to which a data printing apparatus according to the present invention is applied when viewed from a back surface side. In FIG. 1, a film 4 fed from a patrone 3 loaded in a film feed chamber 2 arranged at one side edge of a camera main body 1 is taken up around a take-up spool 6 in a film take-up chamber 5 arranged at the other side edge of the main body 1. When movement of the film 4 is transmitted to a rotary roller 7 pressed against the film 4, a slit disk 9 in which light-transmission portions and light-shielding portions are alternately formed at equal angular intervals is rotated, and a photointerrupter 8 counts the slits of the slit disk 9. The photointerrupter 8 is constituted by opposing light-emitting and light-receiving portion sandwiching a path of the slit disk 9 therebetween. More specifically, the slit disk 9 and the photointerrupter 8 constitute a film moving amount detection unit 10, which outputs a film travel pulse signal Vg according to a film travel amount.

On the other hand, openings 13a and 13b are formed on two sides near upper side edges of a film aperture 13 for defining a photographing frame of the film 4. First and second displays 11b and 11a shown in FIG. 2A and projection lenses 12b and 12a for focusing light beams from the displays 11b and 11a via the openings 13b and 13a are arranged at positions corresponding to the openings 13b and 13a. Two sets of projection optical systems, constituted by these displays 11a and 11b, the projection lenses 12a and 12b, and the openings 13a and 13b, for printing data to be printed, e.g., a date, on a film surface, are prepared to guarantee data printing on the last frame of a film in the first embodiment. More specifically, when a one-frame photographing operation of a camera is completed, the film 4 is fed in a wind-up direction A. In this case, the first display 11b is dynamically turned on in synchronism with the film feed operation, thereby writing data such as a date on a film surface during feeding. However, when the photographing operation of the last frame is completed, the film is rewound without being wound up. Therefore, in order to write data such as a date on the last frame, the second display 11a is arranged. In this case, one set of the display need only be arranged if the flow of emission processing is changed, as will be described in detail later with reference to FIG. 4.

Figure 3:
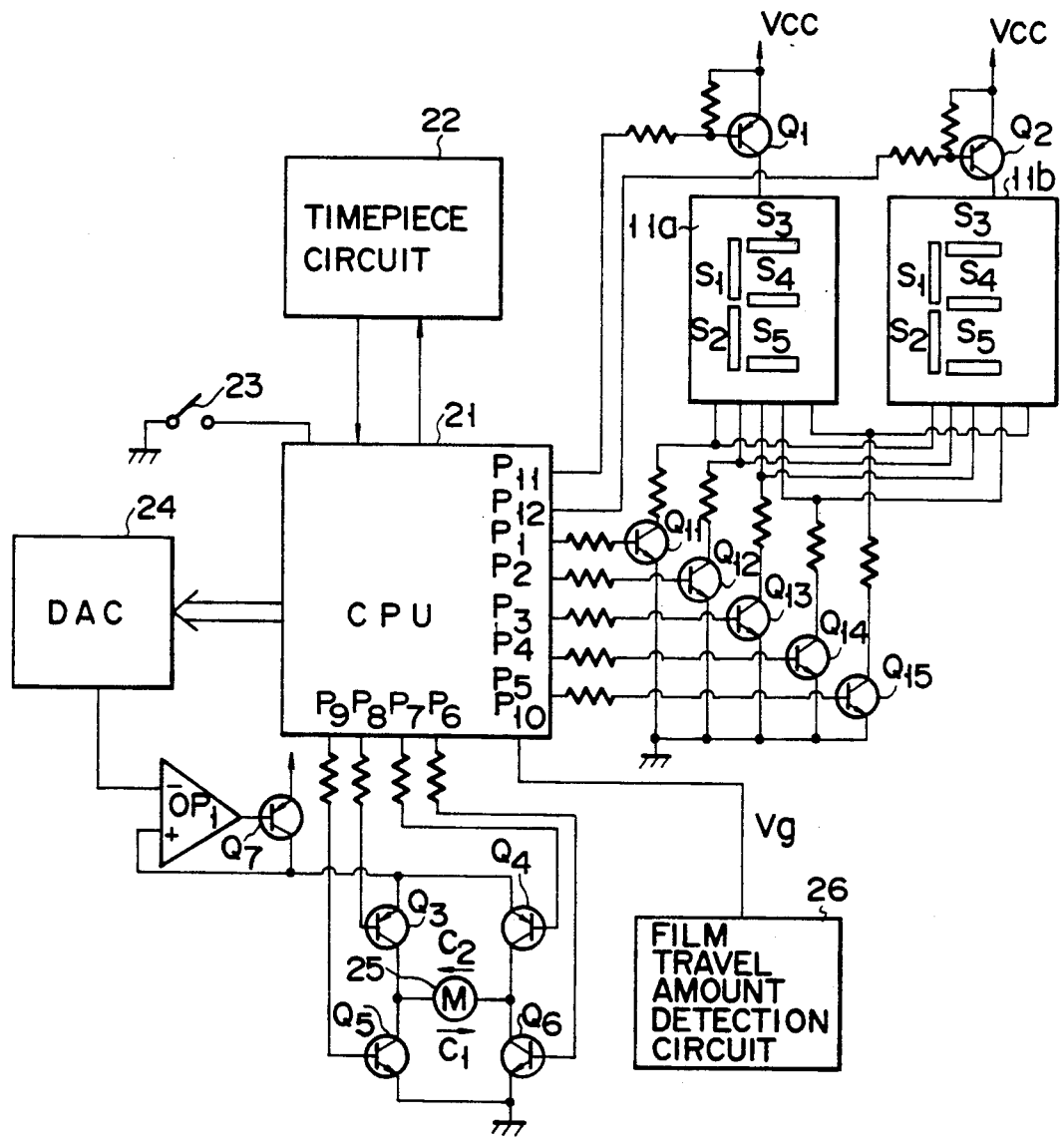
FIG. 3 is a block diagram showing an electrical arrangement of a data printing apparatus according to the first embodiment of the present invention.

FIG. 3 is a block diagram showing an electrical arrangement of the first embodiment. In FIG. 3, a CPU 21 for controlling operation sequences of respective circuits in the first embodiment is connected to a timepiece circuit 22 for counting clock pulses supplied from the CPU 21 to form data such as a date to be printed on the film, and a release switch 23 for controlling a release operation of a camera. The CPU 21 supplies a signal to a DAC (digital-to-analog converter) 24 so as to change an output from a constant voltage circuit consisting of an operational amplifier $OP_1$ and a transistor $Q_7$, i.e., a voltage to be applied to a motor bridge circuit consisting of transistors $Q_3$ to $Q_6$, thereby controlling a moving speed of the film.

In order to rotate a motor 25 connected between the centers of arms of the bridge circuit in the forward direction to wind up a film by controlling the motor bridge circuit, a terminal $P_6$ of the CPU 21 is set active "H", and its terminal $P_8$ is set active "L", so that the opposing transistors $Q_3$ and $Q_6$ of the bridge circuit are enabled. Thus, a motor current indicated by an arrow $C_1$ in FIG. 3 flows through the motor 25, and hence, the motor 25 is rotated in the forward direction. When a terminal $P_7$ of the CPU 21 is set active "L", and its terminal $P_9$ is set active "H", since the transistors $Q_4$ and $Q_5$ are enabled, the motor 25 is rotated in the reverse direction, thus rewinding a film. When the output ports $P_6$ and $P_9$ of the CPU 21 are set active "H", the transistors $Q_5$ and $Q_6$ are enabled, and the motor 25 is braked by short-circuiting, thus stopping a feed operation of the film.

A film travel amount detection circuit 26 corresponds to the film moving amount detection unit described with reference to FIG. 1, and supplies a film travel pulse signal Vg to an input port $P_{10}$ of the CPU 21.

A circuit for driving the first and second displays 11b and 11a will be described below. When an output port $P_{11}$ or $P_{12}$ of the CPU 21 is set active "L", a transistor $Q_1$ or $Q_2$ corresponding to the port $P_{11}$ or $P_{12}$ is enabled, and the display 11a or 11b is set in an ON enable state. In this state, when an output port $P_1$ of the CPU 21 is set active "H", a transistor $Q_{11}$ is enabled, and the display segments $S_1$ of the displays 11b and 11a connected to the collector of the transistor $Q_{11}$ through a resistor can be turned on. If the output port $P_{11}$ is at active "L" and the output port $P_{12}$ is at nonactive "H", only the segment $S_1$ of the second display 11a is turned on, and the segment $S_1$ of the first display 11b is kept OFF. Similarly, when output ports $P_2$, $P_3$, $P_4$, and $P_5$ are set active "H", transistors $Q_{12}$, $P_{13}$, $Q_{14}$, and $Q_{15}$ corresponding to these ports are enabled, and the display segment $S_2$ corresponding to the transistor $Q_{12}$, the display segment $S_3$ corresponding to the transistor $Q_{13}$, the display segment $S_4$ corresponding to the transistor $Q_{14}$, and the display segment S5 corresponding to the transistor Q15 can be turned on. The corresponding segments of the first or second display 11b or 11a are turned on depending on whether the output port P11 or P12 of the CPU 21 is set active "L", thereby allowing a data write operation on a film during feeding.

The operation of the first embodiment with the above arrangement will be described below with reference to the flow chart shown in FIG. 4. When this flow starts, the flow advances to step S1, and the CPU 21 shown in FIG. 3 performs a serial communication with the timepiece circuit 22 to receive year, month, and day data therefrom after an exposure operation. Year data is stored at addresses A00 and A01 of a memory, month data is stored at addresses A03 and A04, day data is is stored at addresses A06 and A07, and "—" is expressed by A and stored at addresses A02 and A05, respectively. For example, the relationship between storage addresses and memory contents of data "89-11-04" is as shown in Table 1 below.

TABLE 1

| Address | Memory Content |
|---------|----------------|
| A00 | 8 |
| A01 | 9 |
| A02 | A |
| A03 | 1 |
| A04 | 1 |
| A05 | A |
| A06 | 0 |
| A07 | 4 |

The flow advances to step S2, and a counter of a P.I. (photointerrupter) in the film travel amount detection circuit 26 shown in FIG. 3 is reset. The flow then advances to step S3. In step S3, the DAC 24 is set, thereby setting a motor drive voltage. The flow advances to step S4 to check if a "data printing mode" is set. More specifically, if the data printing mode is set by a data printing mode setting means (not shown) in advance, a data flag is set to be 1. Therefore, whether or not the data flag is 1 is checked. The flow advances to step S5 to detect whether the present frame count of a film is smaller than a film frame count read from a DX code. That is, if (film frame count read from DX code) −(present frame count)>5 is satisfied, the flow advances to step S6; otherwise, the flow advances to step S12. Note that a value "5" is a frame count which is set to reliably print data at and before the last frame, and this film count may be set to be "4", "3", or the like.

In step S6, a wind-up mode is set. That is, a oneframe wind-up count value is set in a register E, and the flow advances to step S7. In step S7, the first display 11b is set in an emission enable state, i.e., the transistor Q2 shown in FIG. 3 is enabled. The flow then advances to step S8. In step S8, whether or not the present film position is a printing start position is checked based on a P.I. count value, and the control waits until a predetermined count value is reached. In step S9, the LEDs of the first display 11b are selectively turned on in correspondence with the P.I. count value. Thereafter, the flow advances to step S10, and whether or not the present film position is a one-frame wind-up end position is checked by determining whether or not the P.I. count value is equal to the content of the register E. The control waits until a predetermined count value is reached. If a count value becomes equal to or larger than the predetermined count value, the flow advances to step S11, and the motor is braked by short-circuiting, thus ending a wind-up operation.

The flow returns to step S5, and if it is determined that (film frame count read from DX code)−(present frame count)>5 is not satisfied, since this means that the film frame count will end soon, a reliable printing operation of date data up to the last frame described above with reference to FIG. 1 is assured by the flow after step S12 (to be described below). More specifically, in step S12, a count value corresponding to a rewind amount necessary for a data printing operation is set in the register E, and the film is rewound by the above-mentioned rewind amount. Thereafter, the flow advances to step S13. In step S13, the second display 11a shown in FIG. 3 is set in an emission enable state, i.e., the transistor Q1 is enabled. The flow advances to step S14, and whether or not the film is rewound by an amount necessary for the data printing operation is checked upon comparison between the register E and the P.I. counter. The flow then advances to step S15. In step S15, a count value according to a wind-up amount necessary for the next photographing operation is calculated on the basis of the rewind amount and the one-frame wind-up amount, and is set in the register E. The flow advances to step S16 to reset the P.I. counter. Thereafter, a wind-up mode is set in step S17. The flow jumps to step S9, and the flow in steps S9 to S11 is executed, thus ending the processing.

Figure 5:
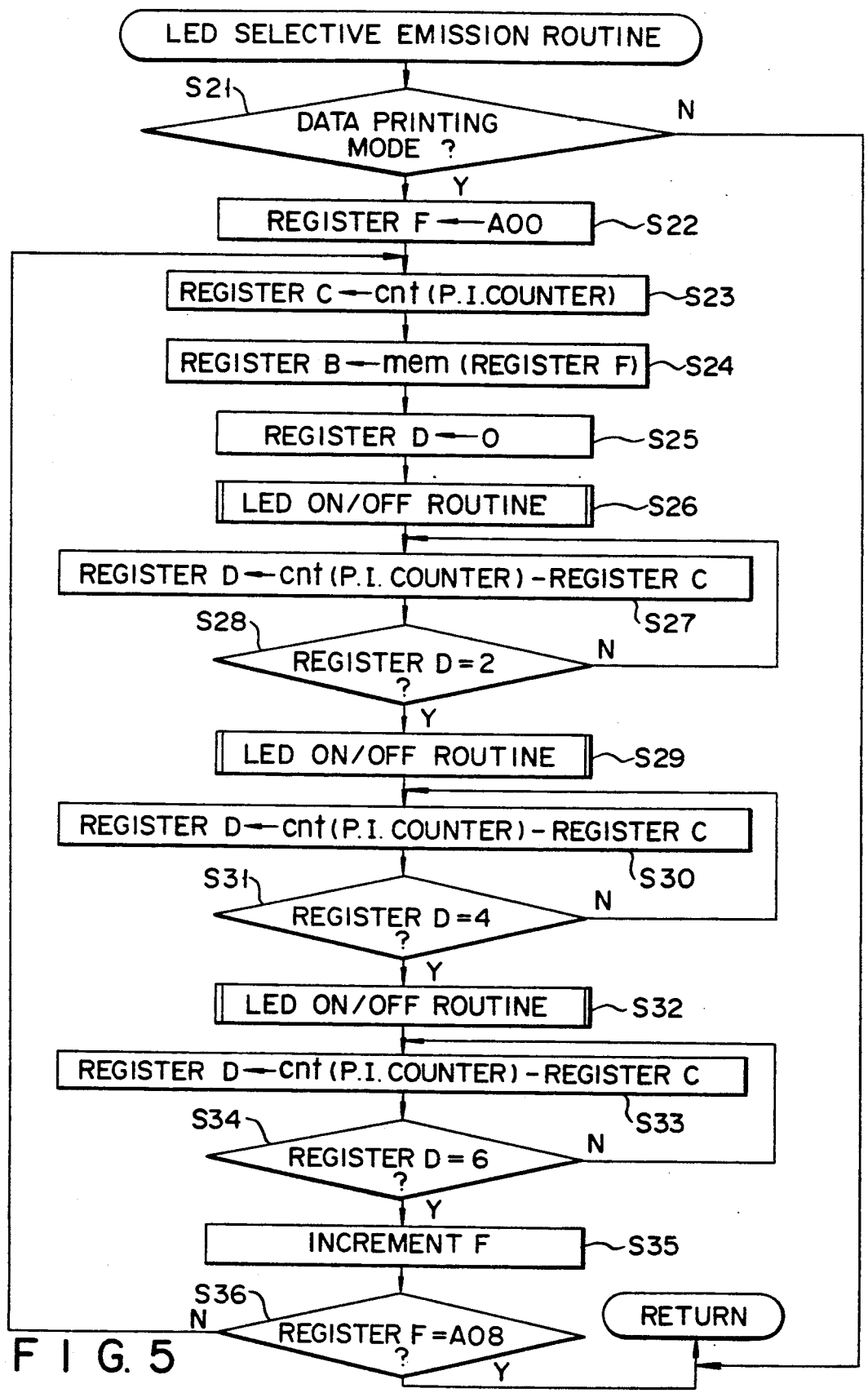
FIG. 5 is a flow chart showing in detail an LED selective emission routine in FIG. 4.

FIG. 5 is a flow chart showing in detail an "LED selective emission routine" shown in step S9 in the flow chart of FIG. 4. In FIG. 5, it is checked in step S21 if a mode for printing data such as a photographing date on a film is set. If N (NO) in step S21, the flow immediately returns to the main routine; otherwise, the flow advances to step S22. In step S22, A00 is input to a register F. More specifically, the register F stores memory addresses where year, month, and day data are stored, and the flow then advances to step S23. In step S23, a present count value of the P.I. counter is stored in a register C. The flow then advances to step S24, and date data stored at the address A00 stored in the register F is input to a register B. The flow then advances to step S25. In step S25, 0 is set in a register D, and the flow advances to step S26. In s S26, the control calls an "LED ON/-OFF routine" (to be described later with reference to FIGS. 6A and 6B). The register D stores emission timing data for writing data on a film during feeding, as will be described later with reference to FIG. 7.

In step S27, a change amount of the P.I. count value is input to the register D. In step S28, steps S27 and S28 are repeated until the change amount becomes 2. If Y (YES) in step S28, the flow advances to step S29. In step S29, the control calls the "LED ON/OFF routine". The flow advances to step S30, and the change amount of the P.I. count value is input to the register D. The flow advances to step S31, and steps S30 and S31 are repeated until the change amount becomes 4. If Y in step S31, the flow then advances to step S32.

In steps S32 and S33, the same processing as in steps S29 and S30 is executed, and the flow advances to step S34. Steps S33 and S34 are repetitively executed until the change amount of the P.I. count value reaches 6. If Y in step S34, the flow advances to step S35, and the register F is incremented to indicate an address where the next date data is stored. The flow advances to step S36 to check if the content of the register F has reached A08. If N in step S36, the flow returns to step S23, and the above-mentioned operations are repeated until the content of the register F reaches A08. If Y in step S36, the "LED selective emission routine" in step S9 is ended, and the control returns to step S10 shown in FIG. 4.

In this manner, a character can be formed by selectively emitting the LEDs when the content of the register D for controlling an emission timing is 0, 2, or 4. The reason why the control waits in step S34 until the content of the register D reaches 6 is to regulate an intercharacter interval.

Figure 6A:
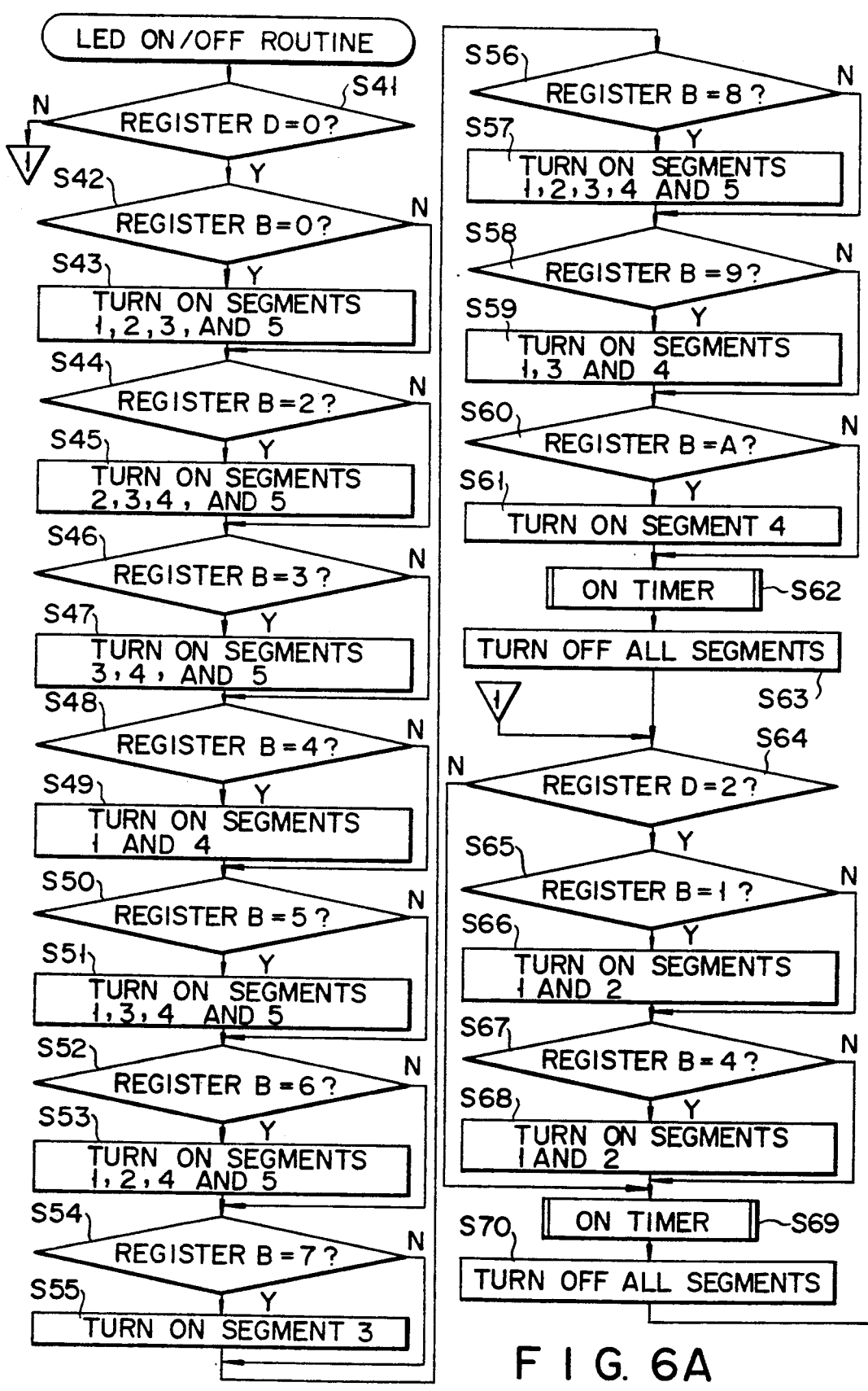
FIGS. 6A and 6B are flow charts showing in detail an LED ON/OFF routine.
Figure 6B:
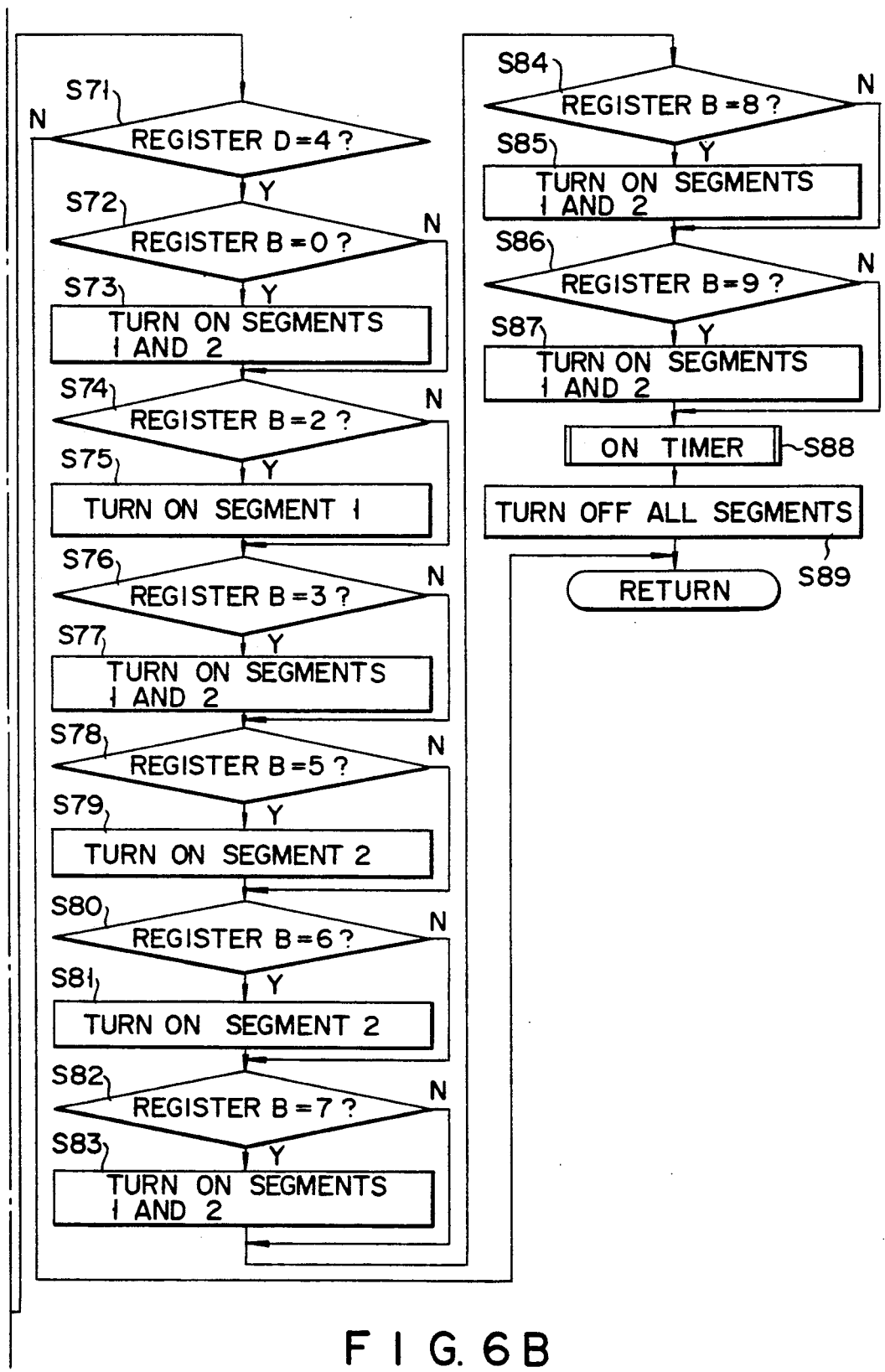

FIGS. 6A and 6B are flow charts showing in detail the "LED ON/OFF routine" in steps S26, S29, and S32 in the flow chart shown in FIG. 5. In this flow chart, the LED are turned on based on data stored in the register D and associated with an emission timing, and data stored in the register B and associated with the type of character, and is turned off after the elapse of a predetermined period of time. FIG. 7 shows the progress of a printing operation of decimal number as characters on a film.

In FIGS. 6A and 6B, when the "LED ON/OFF routine" is started, it is checked if the register D is 0 (step S41). If N in step S41, the flow jumps to step S64 (to be described later). However, if Y in step S41, the flow advances to step S42 to check if the register B is 0. If N in step S42, the flow jumps to step S44; otherwise, the display segments $S_1$, $S_2$, $S_3$ and $S_5$ are turned on (in this flow, the segments will be abbreviated as "segments 1, 2, 3, and 5") in step S43, and the flow then advances to step S44. More specifically, the segments to be turned on at an emission timing 0 are selected and turned on. When a character to be displayed is 0, display segments to be turned on are selected in steps S42 and S43; when it is 2, in steps S44 and S45; when it is 3, in steps S46 and S47; when it is 4, in steps S48 and S49; when it is 5, in steps S50 and S51; when it is 6, in steps S52 and S53; when it is 7, in steps S54 and S55; when it is 8, in steps S56 and S57; when it is 9, in steps S58 and S59; when it is "—", in steps S60 and S61. A description for a character "1" is omitted since there are no segments to be turned on at the emission timing 0 for the character "1", as shown in FIG. 7. As will be described later, when a character to be displayed is "1", the segments 1 and 2 are turned on at an emission timing 2. In this manner, when the display segments to be turned on are selected according to the type of character to be displayed, the flow advances to step S62, and the selected segments are turned on for a time determined by an ON timer for determining an ON time. Thereafter, in step S63, all the segments are turned off. Thus, an operation in units of numerals at the emission timing 0 is ended.

At an emission timing 1, as shown in FIG. 7, none of segments need be turned on, and the control advances to the emission timing 2. At the emission timing 2, the segments 1 and 2 are turned on when characters "1" and "4" are to be displayed, as shown in FIG. 7. All the segments are turned off for characters other than "1" and "4". When a character "1" is to be displayed, steps S65 and S66 are executed, and when a character "4" is to be displayed, steps S67 and S68 are executed. The flow then advances to steps S69 and S70. In steps S69 and S70, the selected segments are turned on for a time determined by the ON timer in the same manner as in steps S62 and S63, and thereafter, all the segments are turned off.

At an emission timing 3, as shown in FIG. 7, none of segments are turned on. At an emission timing 4, the segments 1 and 2 of a character "0", "3", "7", "8", or "9", or the segment 1 of a character "2", or the segment 2 of a character "5" and "6" must be turned on. Thus, referring back to the flow chart shown in FIGS. 6A and 6B, the same flow as described above is executed in steps S71 to S89. When the control advances to an emission timing 5, since there are no segments to be turned on at this timing, the "LED ON/OFF routine" is ended, and the control returns to the main routine. As a result of the above-mentioned operations, characters having patterns shown in the last column of FIG. 7 are optically recorded on the film surface.

Figure 8:
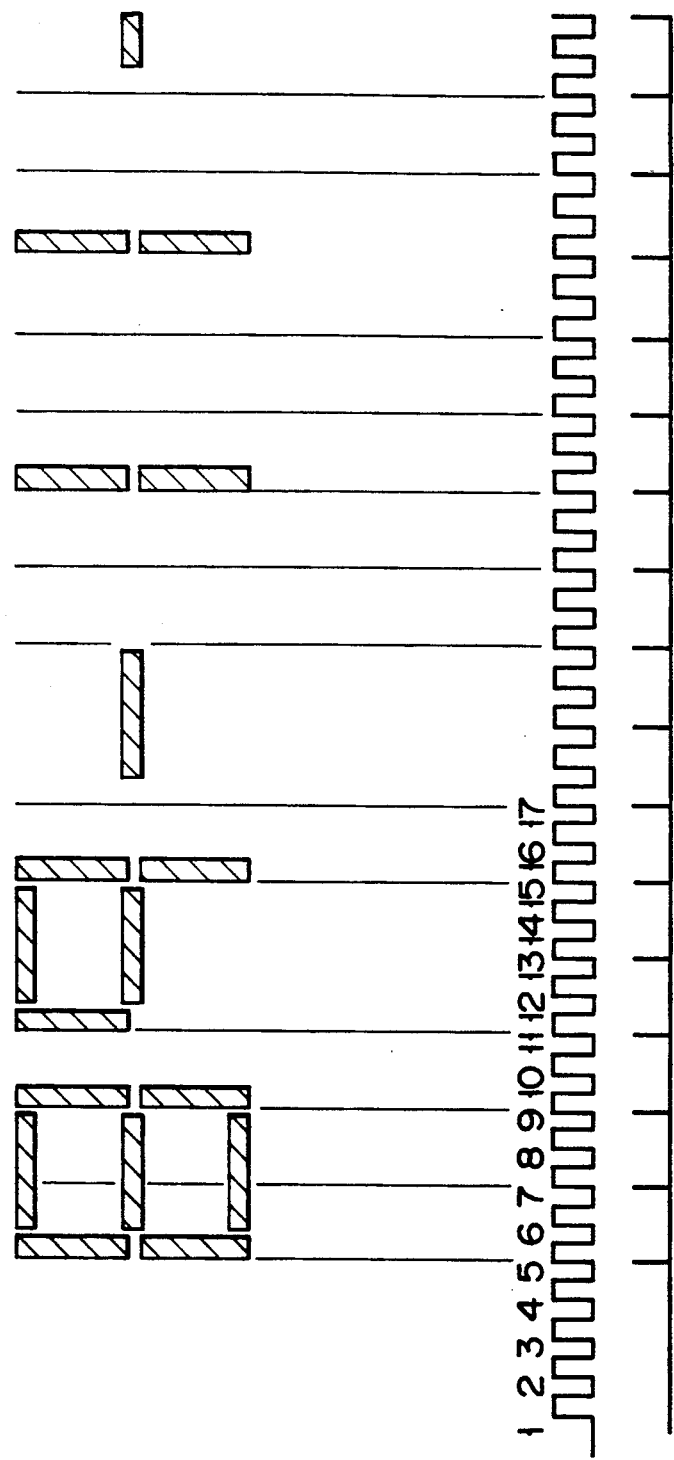
FIG. 8 is an explanatory view showing emission timings when "89-11" is printed.

As described above, according to the first embodiment, for example, when year and month data "89-11-" are recorded on a moving film surface using the display having the five segments shown in FIG. 2A, all or some of the five segments are turned on in correspondence with emission timings, as shown in FIG. 8, and desired characters can be recorded with high quality. For example, "1" is formed at the emission timing 2.

Figures 10A, 10B, 10C:
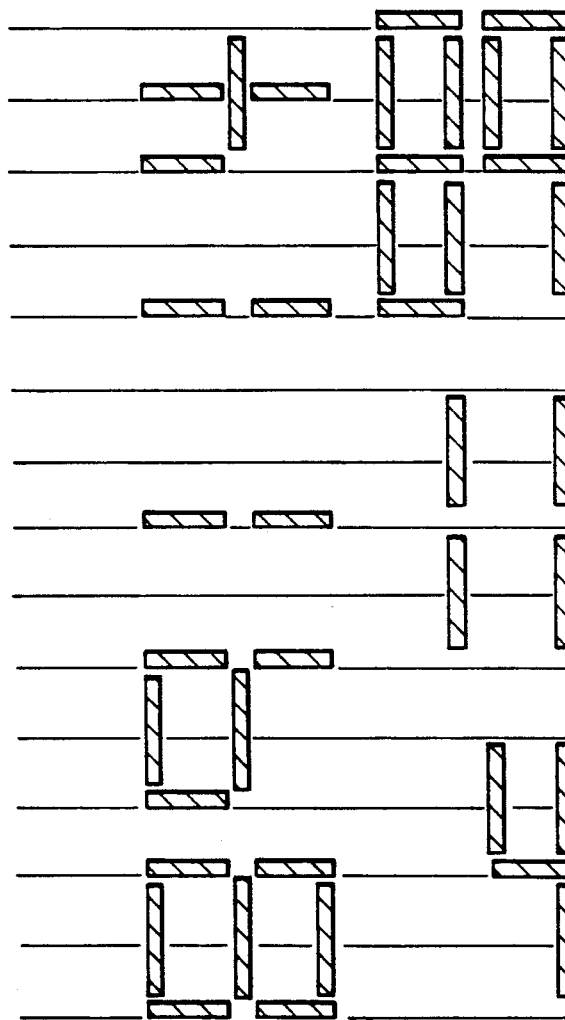
FIGS. 10A, 10B, and 10C show printing examples of "89 11 4" according to the second embodiment shown in FIG. 9.
Figure 11:
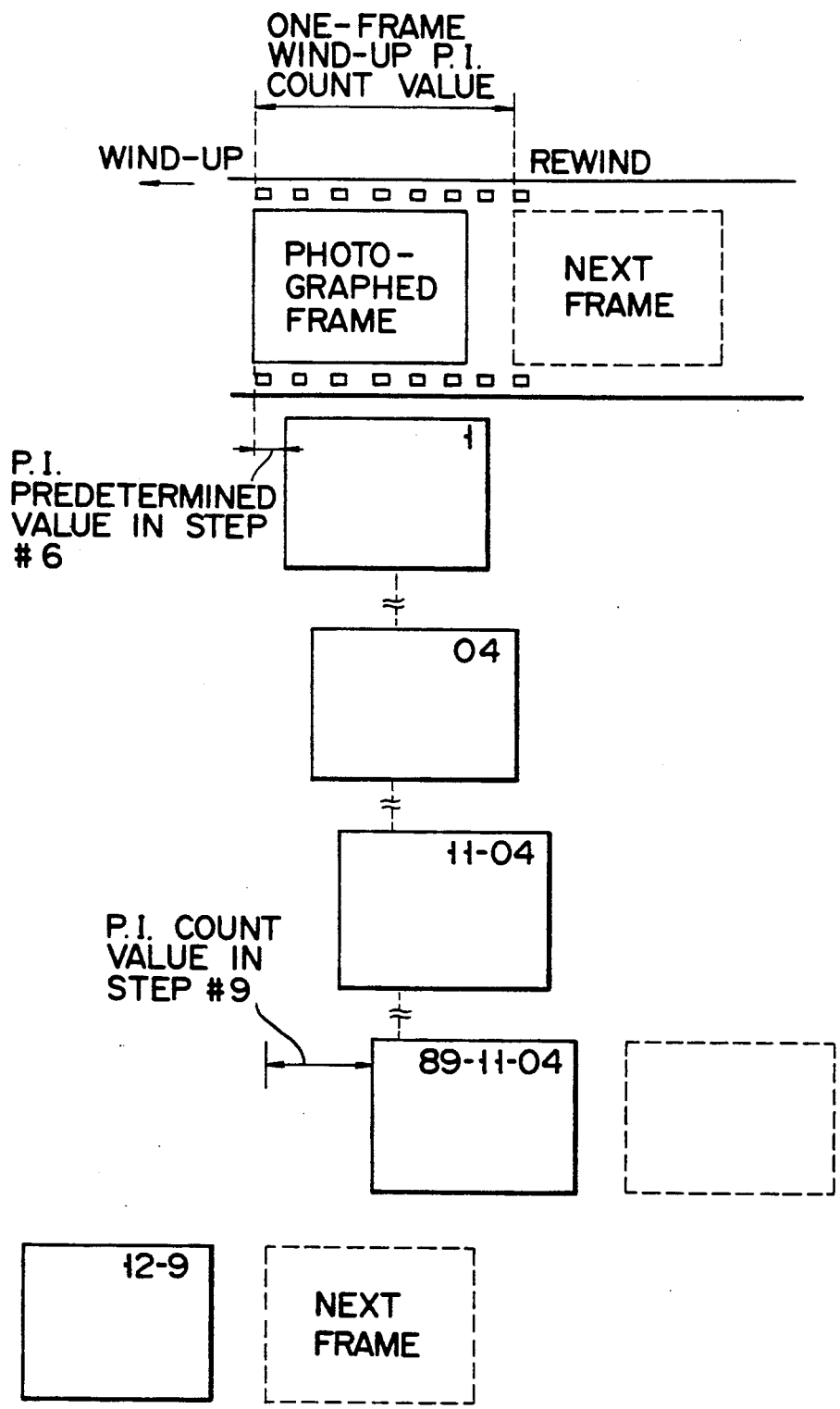
FIG. 11 is a diagram for explaining the third embodiment of the present invention.

FIG. 9 is a block diagram of a data printing apparatus for a camera according to the second embodiment of the present invention. FIGS. 10A to 10C show fonts of year, month, and day data optically recorded on a film surface according to the second embodiment. In the second embodiment, the display segments shown in FIG. 2C are used to cope with photographing operations in both the vertical and horizontal directions. Main differences between the first and second embodiments are that a vertical/horizontal detector 32 is arranged, and that segment drive transistors $Q_{16}$ and $Q_{17}$ are added in the second embodiment since the display segments shown in FIG. 2C are used in place of those shown in FIG. 2A or 2B. Since the second embodiment is substantially the same as the first embodiment except for these differences, the same reference numerals in this embodiment denote the same parts as in the first embodiment, and a detailed description thereof will be omitted. Note that various means for detecting whether a camera is held at a vertical or horizontal position are known. For example, a means disclosed in Published Unexamined Japanese Patent Application No. 55-126225 may be adopted.

FIGS. 10A to 10C show printing examples of year, month, and day data (in this embodiment, "89-11-04") optically recorded on a film surface according to the second embodiment. FIG. 10A shows horizontally written data, and FIGS. 10B and 10C show vertically written data. FIG. 10B shows a vertical 2 mode in a direction $A_1$ in FIG. 10B, and FIG. 10C shows a vertical 1 mode in a direction $A_2$ in FIG. 10C. The CPU fetches and stores three different photographing position data in the vertical 1, vertical 2; and horizontal modes using the vertical/horizontal detector 32 shown in FIG. 9, and turns on/off the segments according to the stored data, thereby writing data suitable for a photographing operation at a vertical or horizontal position. Since the flow chart of the second embodiment can be configured in the same manner as that of the flow chart described in detail above with reference to the first embodiment, a description thereof will be omitted.

FIGS. 11 to 15 show the third embodiment of the present invention. In this embodiment, a film is rewound by a predetermined amount upon every photographing operation, and data is printed during the rewinding operation. In this case, only a display 11a is used, as shown in FIG. 12. Year, month, and day data input by a serial communication with a timepiece circuit are as shown in Table 2 below. That is, as compared to Table 1, the contents of the memory stored at the respective addresses are reversed.

TABLE 2

| Address | Memory Content |
|---------|----------------|
| A00 | 4 |
| A01 | 0 |
| A02 | A |
| A03 | 1 |
| A04 | 1 |
| A05 | A |
| A06 | 9 |
| A07 | 8 |

Figure 13:
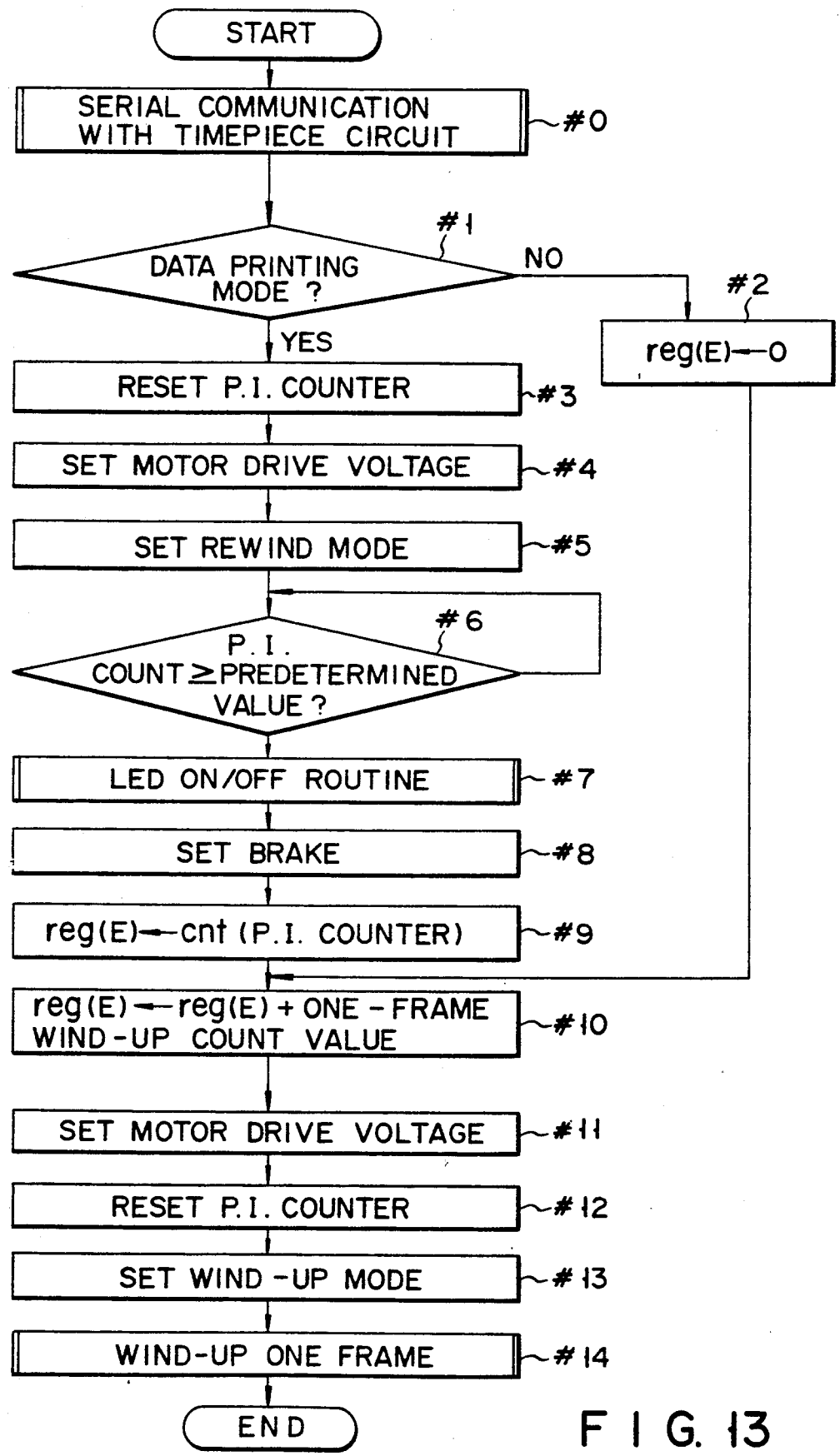
FIG. 13 is a flow chart showing an operation of the third embodiment.

This embodiment will be described below with reference to the flow chart shown in FIG. 13. In step #0, year, month, and day data are written at addresses A00 to A07 by a serial communication with the timepiece circuit. It is then checked if a data printing mode is set (step #1). If NO in step #1, "0" is set in a register E in step #2, and the flow jumps to step #10. If YES in step #1, a P.I. count value necessary for winding up one frame is set in the register E (step #3). An optimal motor drive voltage for the data printing mode is set (step #4). In step #5, a rewind mode is set. In step #6, whether or not the present film position is a printing start position is determined by checking if the P.I count value is equal to or larger than a predetermined value (see FIG. 11). A printing operation is then started from the printing start position in accordance with an LED ON/OFF routine (step #7). A motor is then braked to stop a rewind operation (step #8). In step #9, a P.I. count value required for the rewind operation is stored in the register E (see FIG. 11). In step #10, a sum of the P.I. count value and a P.I. count value necessary for winding up one frame is set in the register E. In step #11, a motor drive voltage optimal for the wind-up operation and higher than that set in step #14 is set. Thereafter, a wind-up mode is set, and the film is wound up by one frame (steps #13 and #14).

Figure 14A:
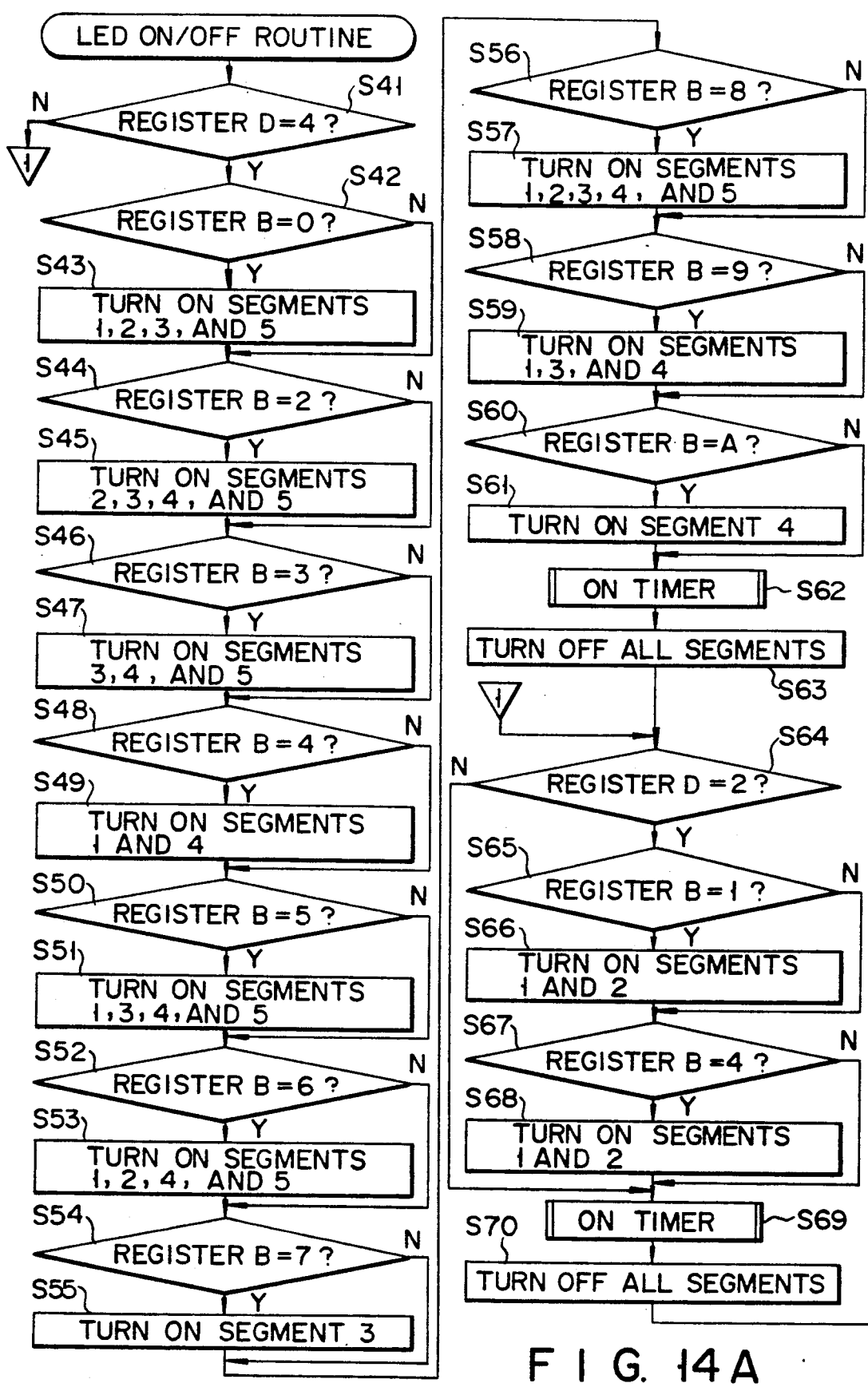
Figure 15:
FIG. 15 is an explanatory view showing the progress of a printing operation of decimal number as characters on a film in association with registers D and B.

FIGS. 14A and 14B are flow charts showing the LED ON/OFF routine of the third embodiment, and corresponds to FIGS. 6A and 6B. As can be seen from FIGS. 14A and 14B, differences from FIGS. 6A and 6B are that "4" is set in the register D in step S41, and that "0" is set in the register D in step S71. FIG. 15 shows the progress of a printing operation of decimal numbers as characters on a film in association with the registers D and B like in FIG. 7.

In each of the above embodiments, the light-emitting display segments comprising LEDs have been exemplified. However, a combination of an LED and a light-projection device may be adopted to obtain the same effects as described above.

Figure 16A:
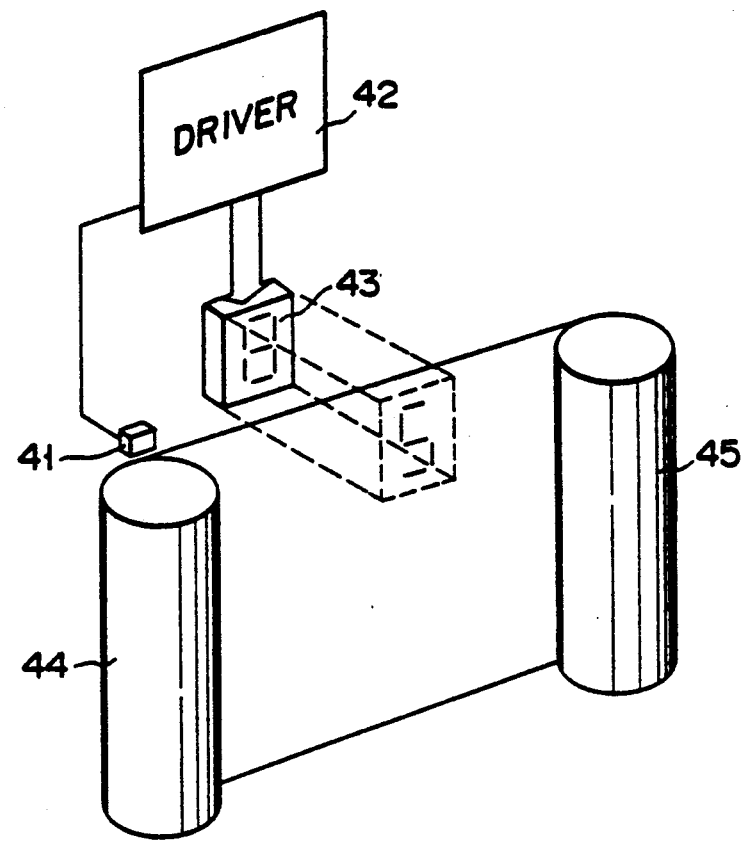
FIGS. 16A and 16B are views showing a prior art wherein data is printed on a traveling film using a 7-segment display.
Figure 16B:
Figure 17:
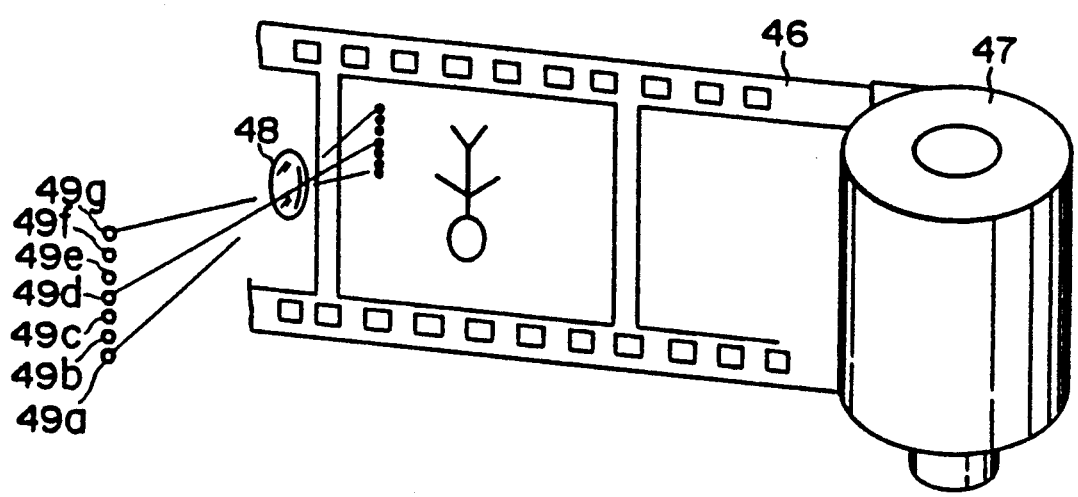
FIG. 17 is a view showing another prior art wherein data is printed on a traveling film using a plurality of linearly arranged light-emitting elements.

According to the above embodiments, since numerals are formed by selectively turning on display segments consisting of two vertical segments and three horizontal segments in synchronism with travel of a film without forming a numeral string by a conventional 7-segment numeral display, the number of wirings can be reduced to six (eight wirings are required in the prior arts). Thus, the number of driver circuits can be reduced, and a driver IC can be rendered compact accordingly. As a result, the apparatus can enjoy improved reliability, an increase in space factor, and low cost. Furthermore, in view of character quality, although the conventional 7-segment numeral display displays "4" and "1", as shown in FIG. 16B, they can be displayed, as shown in FIG. 7 or 10, and hence, are easy to see. In addition, an interval between adjacent characters can be uniformed as compared to conventional characters. Therefore, a data write operation can be performed using characters with higher quality. In particular, the present invention is effective when two sets of projection optical systems are arranged, and when an arrangement corresponding to a vertical photographing position is adopted.

As described above, according to the present invention, a smaller number of display segments are turned on/off in synchronism with travel of a film, and data recording using high-quality characters can be attained. In addition, the number of elements in a drive circuit can be reduced. In this manner, remarkable effects can be provided, that is, a camera can be rendered compact, its cost can be reduced, and reliability can be improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data printing apparatus comprising:
   data input means;
   film feed means for feeding a film by a driving operation of a motor;
   film feed amount detection means for detecting a feed amount of the film;
   three light-emitting segments arranged at substantially equal intervals and arranged substantially parallel to a feed direction of the film;
   two light-emitting segments arranged substantially perpendicular to the feed direction of the film;
   an optical path for guiding light from said light-light-emitting segments to a film surface; and
   emission control means for selectively turning on said light-emitting segments during a feed operation of the film on the basis of an output from said film feed amount detection means, and an output from said data input means;
   said emission control means including means for selectively turning on said two light-emitting segments at three positions including a first position where said two light-emitting segments are located at a left portion of a numeral, a second position where said two light-emitting segments are located at a right portion of the numeral, and an intermediate position between the first and second positions during the feed operation of the film in accordance with the output from said data input means;
   wherein a data numeral is formed on a film surface by said selectively turning on of said three and two light-emitting segments.

2. An apparatus according to claim 1, wherein said two light-emitting segments are commonly used in a case wherein a left portion of a numeral is formed and in a case wherein a right portion of the numeral is formed during the feed operation of the film in accordance with a type of numeral.

3. An apparatus according to claim 1, wherein a pair of light-emitting segments are arranged above and below a central light-emitting segment of said three light-emitting segments which are arranged substantially parallel to the feed direction of the film.

4. An apparatus according to claim 3, wherein said pair of light-emitting segments are arranged to be subjected to emission control when a data character extending along the feed direction of the film is printed.

5. A camera comprising a film feed chamber and a film take-up chamber, comprising:
  data input means;
  film feed means for feeding a film by a driving operation of a motor;
  film feed amount detection means for detecting a feed amount of the film;
  five light-emitting segments arranged to define an E shape;
  an optical path for guiding light from said light-emitting segments to a film surface; and
  emission control means for selectively turning on said light-emitting segments during a feed operation of the film on the basis of an output from said film feed amount detection means, and an output from said data input means;
  said E-shaped light-emitting segments being arranged on each of the film feed chamber side and the film take-up chamber side of the camera, and wherein the light-emitting segments on the film take-up chamber side are normally subjected to emission control, and the light-emitting segments on the feed chamber side are subjected to emission control only when the film nearly ends.

6. An apparatus according to claim 5, wherein when the light-emitting segments on the film feed chamber side are subjected to emission control, said film feed means is operated so as to rewind the film by an amount necessary for a data printing operation, and then to wind up the film again.

7. A data printing apparatus comprising:
  data input means;
  a data printing light-emitting unit including a first light-emitting segment group comprising three rod-like light-emitting segments arranged at predetermined intervals to be parallel to a travel direction of a film, and a second light-emitting segment group comprising two rod-like light-emitting segments arranged in a direction perpendicular to the travel direction;
  travel detection means for detecting travel of the film; and
  emission control means for selectively operating said light-emitting unit at predetermined timings on the basis of an output from said data input means and an output from said travel detection means,
  wherein said emission control means causes said first light-emitting segment group to selectively emit light at the same timing, and causes said second light-emitting segment group to selectively emit light at different timings.

8. A data printing apparatus for a camera, comprising:
  film feed means for feeding a film;
  film moving amount detection means for detecting a moving amount of the film, and for outputting a signal every time a predetermined moving amount is obtained;
  data printing light-emitting means, comprising a plurality of linear light-emitting elements, for printing data on a surface of the film by causing said light-emitting elements to emit light; and
  emission control means for selectively turning on said light-emitting elements of said data printing light-emitting means in accordance with an output from said film moving amount detection means,
  wherein said plurality of light-emitting elements of said data printing light-emitting means are arranged so as not to overlap each other in a travel direction of the film, and
  said emission control means comprises a table which s the light-emitting elements to be turned on in accordance with the film moving amount in correspondence with data to be printed.

9. A data printing apparatus for a camera, comprising:
  film feed means for feeding a film;
  film moving amount detection means for detecting a moving amount of the film, and for outputting a signal every time a predetermined moving amount is obtained;
  data printing light-emitting means comprising a plurality of linear light-emitting elements, which are arranged so as not to overlap each other in a travel direction of the film;
  table storage means for storing a plurality of tab each of which determines the light-emitting elements to be turned on in accordance with the film moving amount in correspondence with data to be printed;
  emission control means for selectively turning on said light-emitting elements of said data printing light-emitting means in accordance with an output from said table storage means;
  vertical/horizontal position detection means for detecting a vertical or horizontal position of the camera; and
  switching means for switching the tables stored in said table storage means in accordance with an output from said vertical/horizontal position detection means.

10. An apparatus according to claim 9, wherein said vertical/horizontal position detection means comprises position data storage means for storing detected vertical/horizontal position data of the camera, in accordance with an exposure operation, and means for outputting the stored data in accordance with a printing operation.

11. An apparatus according to claim 9, wherein said data printing light-emitting means comprises five light-emitting elements parallel to the travel direction of the film, and two light-emitting elements substantially perpendicular to the travel direction of the film.

12. A data printing apparatus for a camera, comprising:
  frame count detection means for detecting a remaining photographable frame count of a loaded film;
  film feed means for feeding the film in one of a first mode for winding up the film to the next frame immediately after a photographing operation, and a second mode for rewinding the film by an amount necessary for a data printing operation after the photographing operation, and then winding up the film to the next frame;
  film moving amount detection means for detecting a moving amount of the film, and for outputting a signal every time a predetermined moving amount is obtained;
  data printing light-emitting means comprising a plurality of linear light-emitting elements, which are arranged so as not to overlap each other in a travel direction of the film;
  emission control signal output means for outputting an emission control signal for selectively turning on said light-emitting elements of said data printing light-emitting means in accordance with an output from said film moving amount detection means; and switching means for, when the remaining frame count detected by said frame count detection means becomes equal to or smaller than a predetermined value, switching a feed mode of said film feed means from the first mode to the second mode.

13. A data printing apparatus for a camera, comprising:

frame count detection means for detecting a remaining photographable frame count of a loaded film;

film feed means for feeding the film in one of a first mode for winding up the film to the next frame immediately after a photographing operation, and a second mode for rewinding the film by an amount necessary for a data printing operation after the photographing operation, and then winding up the film to the next frame;

film moving amount detection means for detecting a moving amount of the film, and for outputting a signal every time a predetermined moving amount is obtained;

two data printing light-emitting means arranged at different positions in a travel direction of the film, and each comprises light-emitting elements arranged in an E shape;

emission control signal output means for outputting an control signal for selectively turning on said light-emitting elements of one of said two data printing light-emitting means in accordance with an output from said film moving amount detection means; and switching means for, when the remaining frame count by said frame count detection means becomes equal to or smaller than a predetermined value, switching an output object of said emission control signal output means from said one data printing lightemitting means to the other data printing light-emitting means, and for switching a feed mode of said film feed means from the first mode to the second mode.

14. A data printing apparatus for a camera, comprising:

film feed means for rewinding a film by an amount necessary for a data printing operation after a photographing operation, and then winding up the film to the next frame;

film moving amount detection means for detecting a moving amount of the film, and for outputting a signal every time a predetermined moving amount is obtained;

data printing light-emitting means comprising a plurality of linear light-emitting elements, which are arranged so as not to overlap each other in a travel direction of the film; and emission control means for selectively turning on said light-emitting elements of said data printing light-emitting means in accordance with an output from said film moving amount detection means.

15. A data printing apparatus for printing a plurality of data in a film feed direction, comprising:

data input means:

film feeding means;

means for detecting a feeding state of the film; and a single data-printing light source consisting of three light-emitting segments arranged in parallel in a feeding direction of the film at predetermined intervals, and two light-emitting segments arranged in a direction substantially perpendicular to said feeding direction, said single dataprinting light source selectively emitting light while a film is being fed so as to print single data in accordance with an output from said data input means and for printing a plurality of data on the film by repeating the selective light emitting while the film is being fed.

16. A data printing apparatus comprising:

data input means;

film feed means for feeding a film by a driving operation of a motor;

film feed amount detection means for detecting a feed amount of the film;

three light-emitting segments arranged at substantially equal intervals and arranged substantially parallel to a feed direction of the film;

two light-emitting segments arranged substantially perpendicular to the feed direction of the film;

an optical path for guiding light from said light-light-emitting segments to a film surface;

emission control means for selectively turning on said light-emitting segments during a feed operation of the film on the basis of an output from said film feed amount detection means, and an output form said data input means; and a pair of light-emitting segments arranged above and below a central light-emitting segment of said three light-emitting segments which are arranged substantially parallel to the feed direction of the film;

wherein a data numeral is formed on a film surface by said selectively turning on of said three and two light-emitting segments.

17. An apparatus according to claim 16, wherein said pair of light-emitting segments are arranged to be subjected to emission control when a data character extending along the feed direction of the film is printed.

18. An apparatus according to claim 16, wherein said two light-emitting segments are commonly used in a case wherein a left portion of a numeral is formed and in a case wherein a right portion of the numeral is formed during the feed operation of the film in accordance with a type of numeral.

* * * * *